United States Patent
Robison et al.

(10) Patent No.: US 9,739,275 B2
(45) Date of Patent: Aug. 22, 2017

(54) SELF-CLEANING DISC VALVE FOR PISTON PUMP

(71) Applicant: Weatherford Technology Holdings, LLC, Houston, TX (US)

(72) Inventors: Clark Robison, Tomball, TX (US); John Kelleher, Houston, TX (US); Michael Knoeller, Humble, TX (US); Jeff Lembcke, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 671 days.

(21) Appl. No.: 13/756,988

(22) Filed: Feb. 1, 2013

(65) Prior Publication Data

US 2013/0195685 A1 Aug. 1, 2013

Related U.S. Application Data

(60) Provisional application No. 61/593,608, filed on Feb. 1, 2012.

(51) Int. Cl.
*F16K 15/00* (2006.01)
*F04B 53/10* (2006.01)
(Continued)

(52) U.S. Cl.
CPC .......... *F04B 53/102* (2013.01); *E21B 43/129* (2013.01); *F04B 7/00* (2013.01);
(Continued)

(58) Field of Classification Search
CPC ........ F04B 53/10; F04B 53/12; F04B 53/102; F04B 53/109; F04B 53/125; F04B 7/00;
(Continued)

(56) References Cited

U.S. PATENT DOCUMENTS 1,577,242 A * 3/1926 Andersen .................. 123/188.7
2,870,783 A * 1/1959 Kehler ...................... 137/516.13
(Continued)

FOREIGN PATENT DOCUMENTS

GB 736427 A 9/1955

OTHER PUBLICATIONS

International Search Report dated May 8, 2014, issued by the European Patent Office in corresponding Application No. PCT/US2013/024448.

*Primary Examiner* — Essama Omgba
*Assistant Examiner* — Stephen Mick
(74) *Attorney, Agent, or Firm* — Patterson & Sheridan, L.L.P.

(57) ABSTRACT

Embodiments of the present disclosure generally provide a disc-valve design with a self-cleaning feature. The self-cleaning feature may be integrated into the valve, for example, by removing a "cut-out" portion between sealing surfaces of ports. These cut-out portions may create vortices that might clean debris from the sealing surfaces. The cut-outs may also provide a place for debris to collect-keeping it away from the sealing surfaces. In addition, or as an alternative to cut-outs, some other type of mechanism, such as sealing members designed to disturb flow to sweep away debris near a sealing surface or helical grooves (rifling) formed in the ports, may also be used to promote self-cleaning.

29 Claims, 7 Drawing Sheets

(51) Int. Cl.
  *F04B 7/00* (2006.01)
  *F16K 15/02* (2006.01)
  *F16K 15/08* (2006.01)
  *E21B 43/12* (2006.01)

(52) U.S. Cl.
  CPC ............ *F04B 53/10* (2013.01); *F16K 15/00* (2013.01); *F16K 15/028* (2013.01); *F16K 15/08* (2013.01); *Y10T 137/4238* (2015.04)

(58) Field of Classification Search
  CPC ........ F16K 25/005; F16K 15/00; F16K 15/08; F16K 15/16; F16K 15/028; F16K 15/144
  USPC .......... 417/53, 545, 546, 553; 137/238, 239, 137/808, 546
  See application file for complete search history.

(56) References Cited

U.S. PATENT DOCUMENTS

| | | | |
|---|---|---|---|
| 2,932,312 A | | 4/1960 | Roeder et al. |
| 3,451,422 A | | 6/1969 | Chorkey |
| 4,236,547 A | * | 12/1980 | Harasewych ................. 137/243 |
| 4,369,022 A | * | 1/1983 | Roeder ......................... 417/571 |
| 4,574,835 A | * | 3/1986 | Williams ................. 137/512.15 |
| 4,582,085 A | * | 4/1986 | Hafner et al. ............. 239/585.3 |
| 5,205,361 A | * | 4/1993 | Farley et al. ................. 166/317 |
| 5,651,664 A | | 7/1997 | Hinds et al. |
| 6,135,203 A | * | 10/2000 | McAnally ................. 166/105.2 |
| 7,712,483 B2 | * | 5/2010 | Nigliazzo et al. ............ 137/546 |
| 8,303,272 B2 | | 11/2012 | Pugh et al. |
| 2003/0125673 A1 | | 7/2003 | Houde et al. |
| 2004/0036046 A1 | * | 2/2004 | Hull et al. .................... 251/121 |
| 2008/0035878 A1 | * | 2/2008 | Stehr et al. .................. 251/368 |

\* cited by examiner (UPSTROKE)

(DOWNSTROKE)

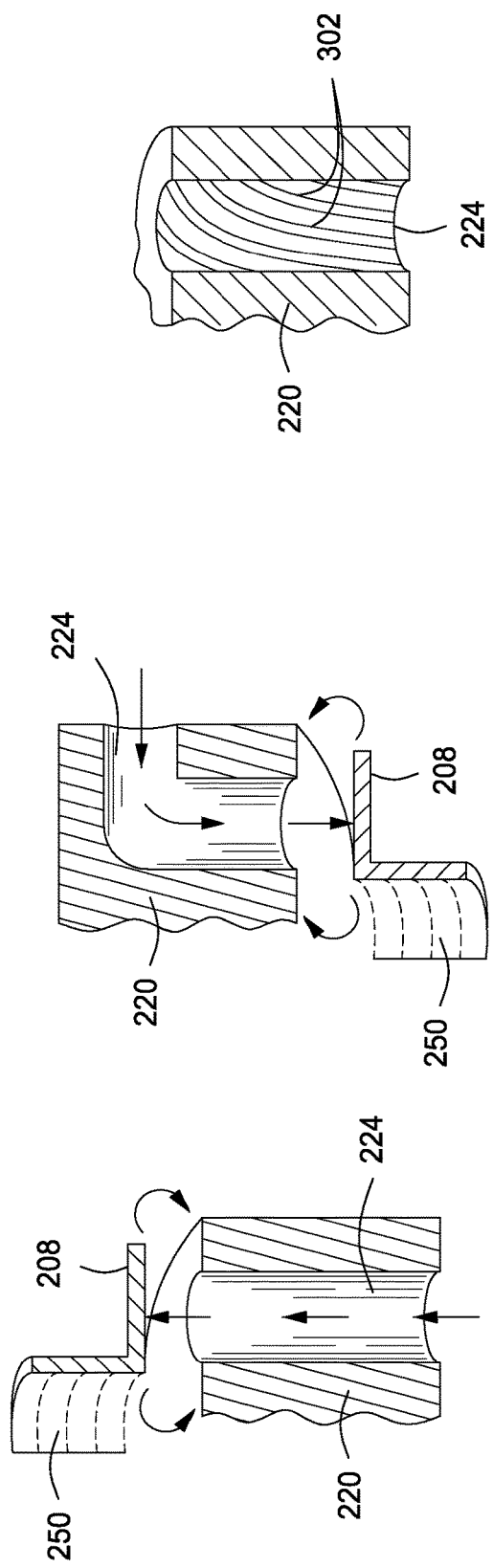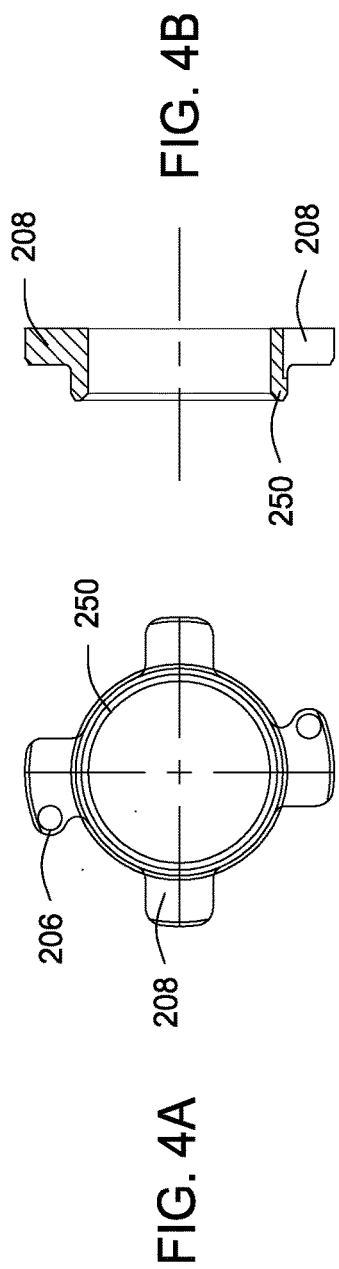

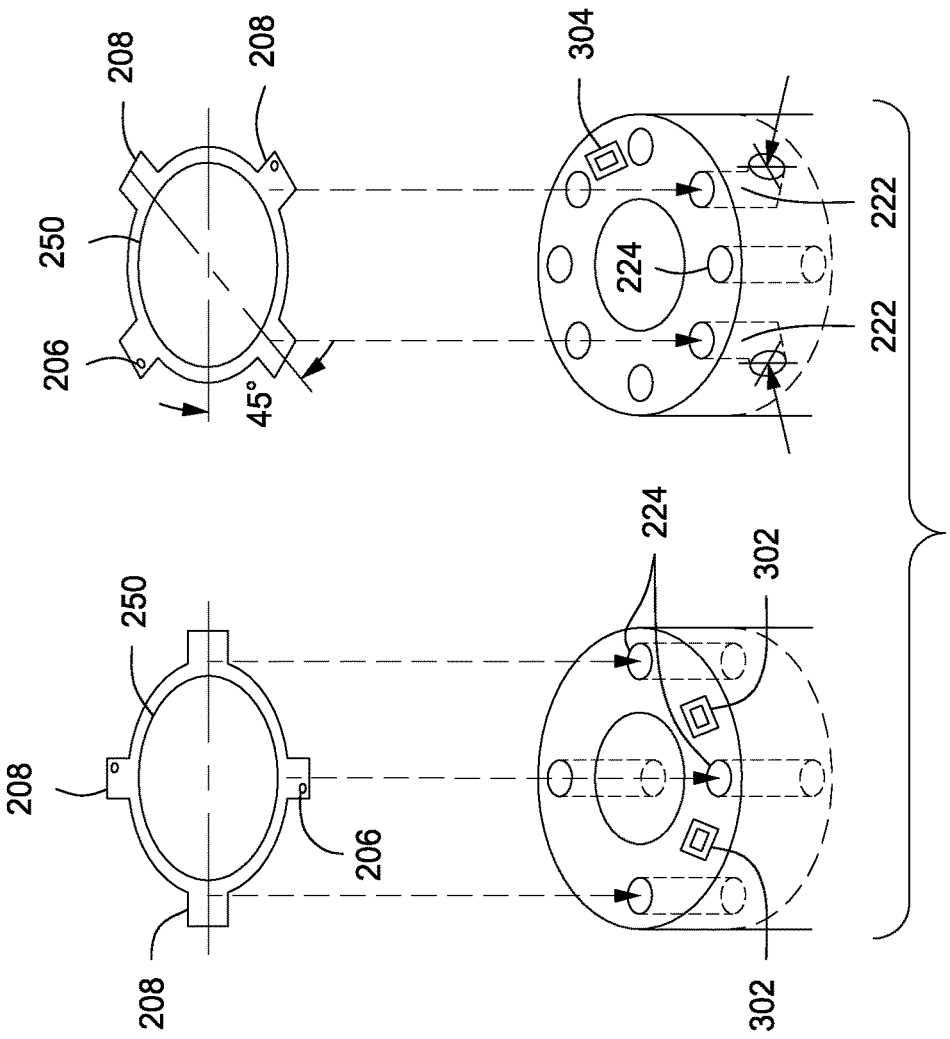
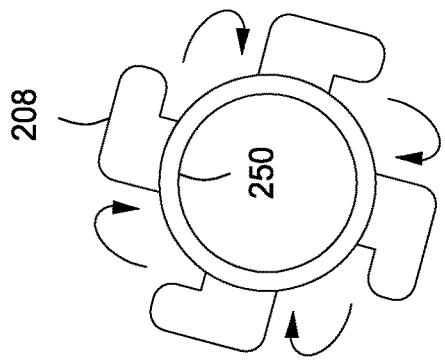
FIG. 6A
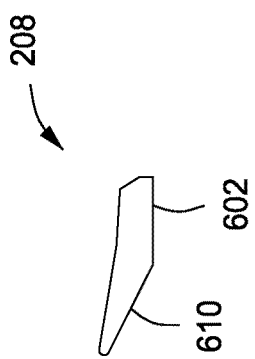
FIG. 6B
FIG. 7

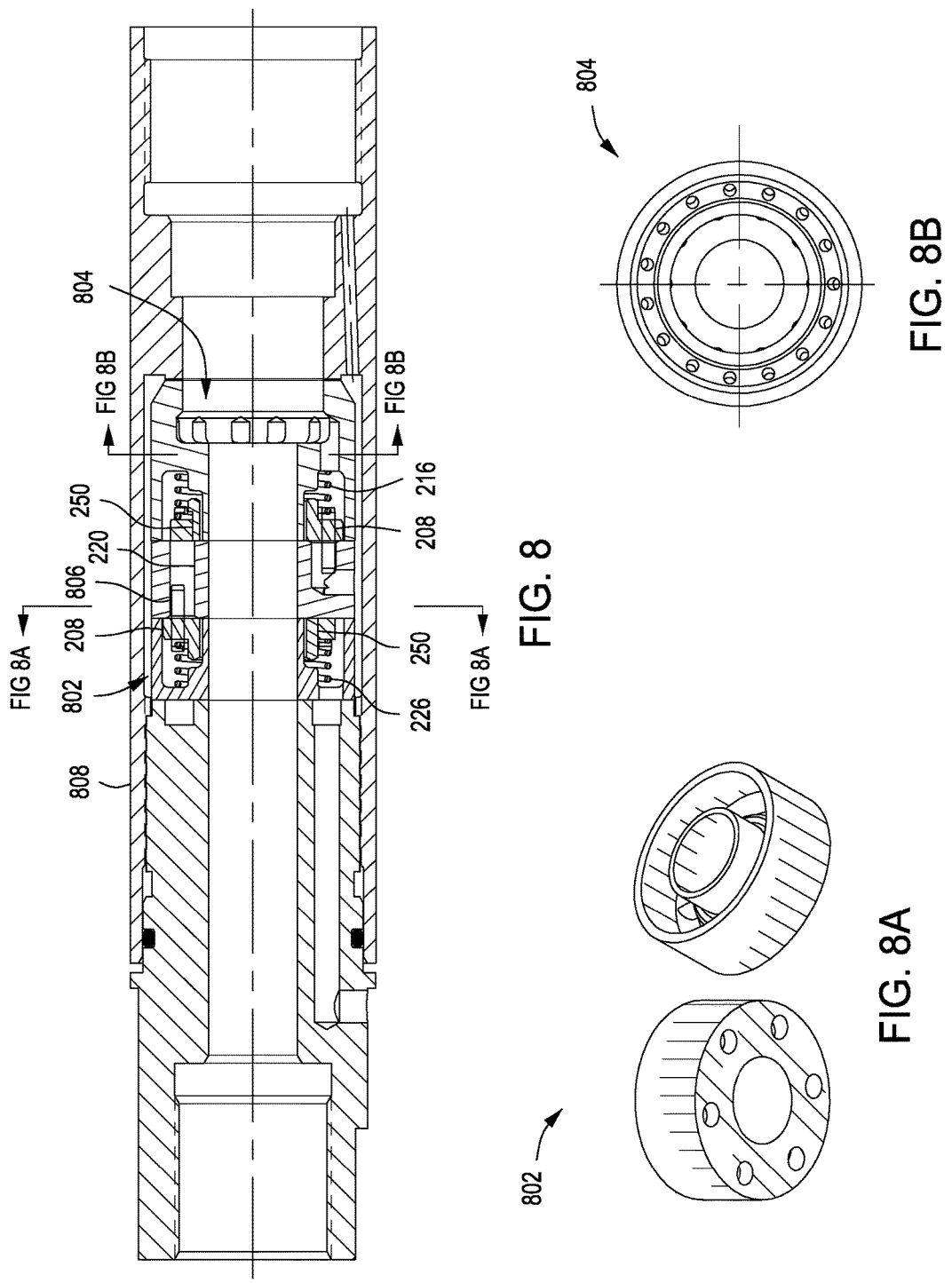

SELF-CLEANING DISC VALVE FOR PISTON PUMP

CLAIM OF PRIORITY UNDER 35 U.S.C. §119

This application claims benefit of U.S. Provisional Patent Application No. 61/593,608 filed Feb. 1, 2012, which is herein incorporated by reference in its entirety.

BACKGROUND OF THE INVENTION

Field of the Invention

Embodiments of this disclosure generally relate to valves for use in downhole pumps.

Description of the Related Art

Pumps can be used in wells to help bring production fluids to the surface. This is often referred to as providing artificial lift, as the reservoir pressure is insufficient for the production fluid to reach the surface on its own.

One type of pump for such operations is a hydraulically-actuated piston pump, such as the pump disclosed in U.S. Pat. No. 8,303,272, incorporated herein by reference. This type of pump is typically deployed downhole in tubing disposed in a wellbore casing. Surface equipment injects power fluid (e.g., produced water or oil) down the tubing to the pump. The power fluid operates to drive an engine piston internally between upstrokes and downstrokes which, in turn, drives a pump piston connected to the engine piston via a rod.

In its upstroke, the pump draws in production fluid to a lower (intake) pump volume below the pump piston. In its downstroke, the pump transfers the production fluid from the lower pump volume to an upper (discharge) pump volume above the pump piston. In a subsequent upstroke, the production fluid and "spent" power fluid (that was used to drive the engine piston) is discharged from the discharge volume via the tubing-casing annulus (or some such parallel path) to the surface equipment for handling.

Hydraulic piston pumps often utilize check valves, such as those shown in FIG. 1, that utilize small balls to prevent back flow within the pump. Assuming a pump that operates in a manner described above, a first check valve 10 may allow flow of the production fluid from the lower pump volume to the upper pump volume on a downstroke as the lower pump volume decreases and pressure in an inlet port 12 rises to a sufficient level to unseat ball 14 (biased in a seated position by spring 16). The check valve 10 prevents back flow of the production fluid to the lower pump volume during the upstroke, as pressure at the port 12 falls with increasing lower pump volume and the ball 14 re-seats.

A second check valve 20 may allow discharge of the production and spent power fluid on an upstroke as the upper pump volume decreases and pressure in an inlet port 22 rises to a sufficient level to unseat ball 24 (biased in a seated position by spring 26). The second check valve 20 also prevents flow of fluid back into the pump on the downstroke, as pressure at the port 22 decreases and ball 24 re-seats.

Unfortunately, balls used in conventional check valves such as these can damage the seat when high volumes of gas are required to pass through the pump. Additionally, debris can lodge between the ball and seat and cause excess leakage in the pump. When the pump stops operating due to the balls sticking open or when the balls damage the valve plate, the pump is typically removed from the well, resulting in substantial repair costs and operating down time.

Therefore, what is needed is an improved check valve assembly that addresses these shortcomings.

SUMMARY OF THE INVENTION

Aspects of the present disclosure generally provide a valve assembly with a self-cleaning feature. The valve assembly generally includes a valve body with at least a first set of one or more ports that form fluid pathways from a first surface of the valve body to a second surface of the valve body, a first disc-plate with sealing members configured to seal the first set of ports at the first surface of the valve body when in a closed position, and a self-cleaning mechanism configured to cause a disturbance in fluid flow within or near the valve body when the first disc-plate moves relative to the first surface of the valve body to seal or unseal the ports, wherein the disturbance in the fluid flow is sufficient to at least one of impede, remove, or displace debris buildup on a surface of the valve body where the sealing members contact.

Aspects of the present disclosure also generally provide a pump assembly, comprising an engine piston, pump piston, and a valve assembly with a self-cleaning feature, such as that described herein, as well as method for using the same.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A illustrates a cut-away side view of an exhaust port during an upstroke, in accordance with aspects of the present disclosure.

FIG. 3B illustrates a cut-away side view of an intake port during a downstroke, in accordance with aspects of the present disclosure.

FIG. 3C illustrates an example port design that includes rifling in an inner surface, in accordance with aspects of the present disclosure.

FIGS. 4A and 4B illustrate a top view and side view, respectively, of an example disc plate, in accordance with aspects of the present disclosure.

FIGS. 6A and 6B illustrate an example design of sealing members of a disc plate to promote disturbed flow in a same direction, in accordance with aspects of the present disclosure.

FIG. 7 illustrates an example orientation of a disc plate with respect to a valve body (valve plate), in accordance with aspects of the present disclosure.

FIGS. 8, 8A, and 8B illustrate an example valve assembly with complementary disc plates arranged in a cage assembly, in accordance with aspects of the present disclosure.

DETAILED DESCRIPTION OF EXAMPLE EMBODIMENTS

Embodiments of the present disclosure generally relate to a piston pump with a disc valve assembly having a self-cleaning feature. As will be described herein, the self-cleaning feature may be integrated into the valve assembly, for example, by removing a "cut-out" portions in the valve body between sealing surfaces of the ports. These cut-out portions may create disturbances (e.g., vortices) that might clean debris from the sealing surfaces. The cut-outs may also provide a place for debris to collect—keeping it away from the sealing surfaces.

In addition, or as an alternative to cut-outs, some other type of mechanism, such as helical grooves (rifling) formed in the ports may create vertical flow that helps clear debris. In addition or alternatively, specially designed sealing members, may also be used to disturb flow and promote self-cleaning. Regardless of the particular mechanism, such a self-cleaning valve assembly may help address drawbacks in conventional check valve assemblies that utilize balls that may damage sealing surfaces and trap debris.

To facilitate understanding, aspects of the present disclosure will be described with reference to a disc valve used in a hydraulic piston pump as a specific, but not limiting, application example. While a particular pump assembly is described, those skilled in the art will appreciate that a disc valve assembly as described herein may be used in a variety of different pumping applications and, more generally, in any type of application where it is desirable to control the flow of a fluid into and/or out of a volume.

Further, various embodiments of a valve assembly are also presented that have other unique design features, but might lack a self-cleaning feature. For example, FIG. 8 illustrates an example valve assembly with complementary disc plates arranged in a cage assembly that may or may not include the self-cleaning features described herein.

An Example Pump System

Figure 1:
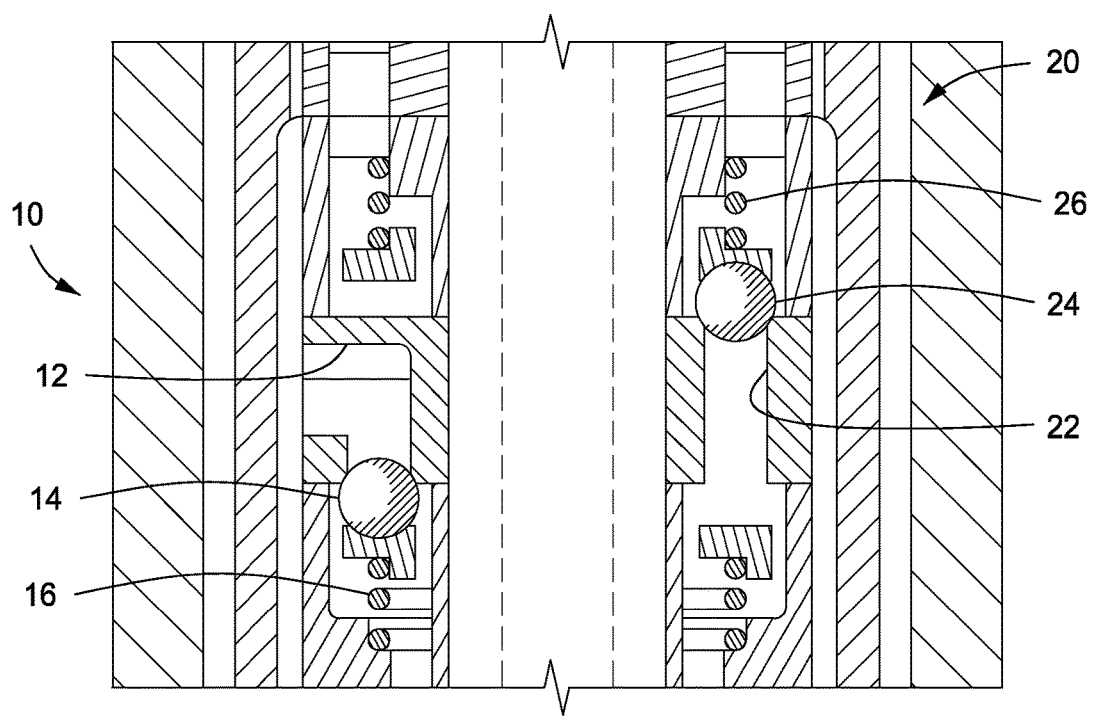
FIG. 1 illustrates an example check valve, in accordance with the prior art.
Figure 2A:
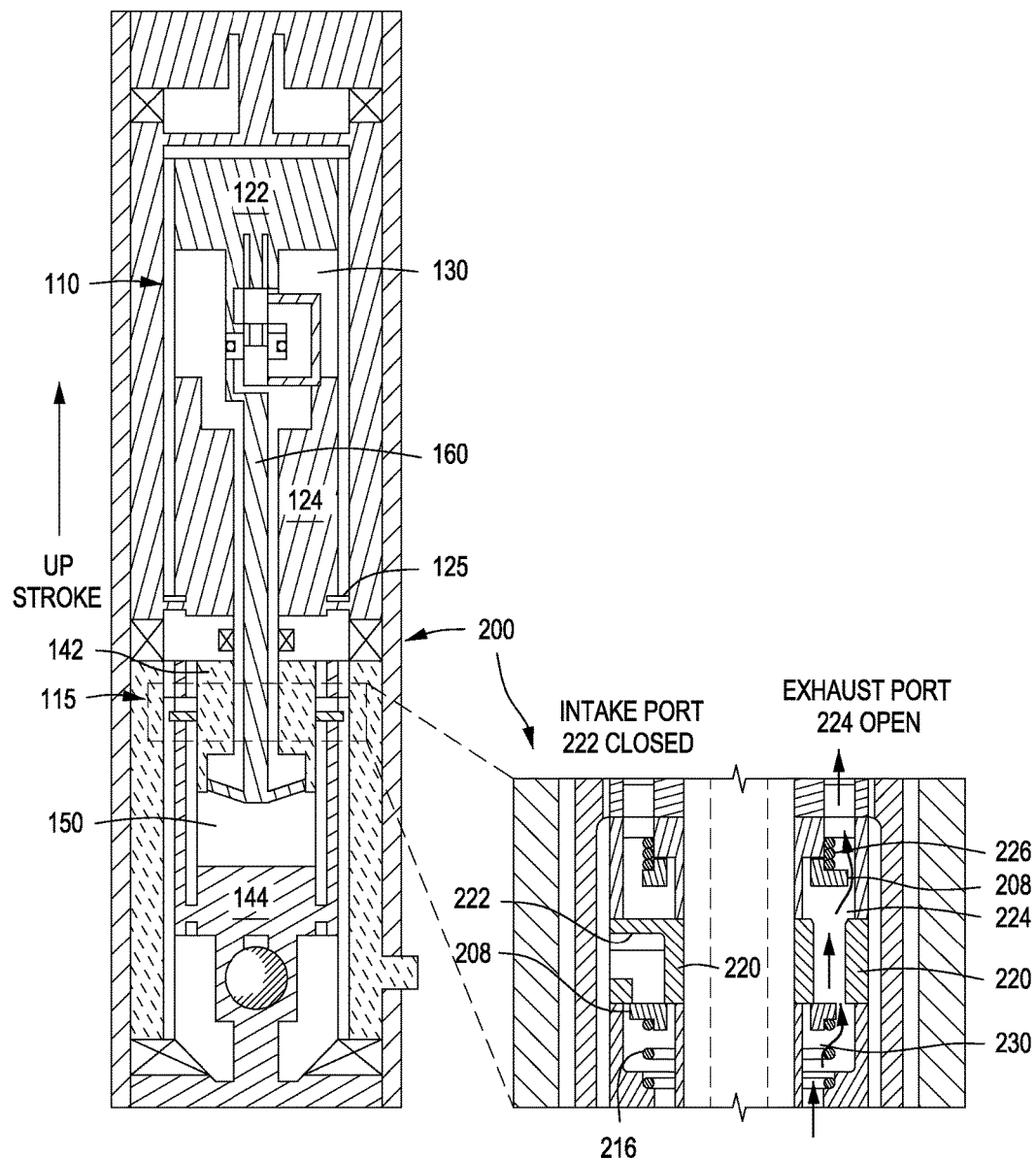
FIGS. 2A and 2B illustrate an upstroke and downstroke, respectively, of an example hydraulic driven piston pump system incorporating a check valve in accordance with the present disclosure.
Figure 2B:
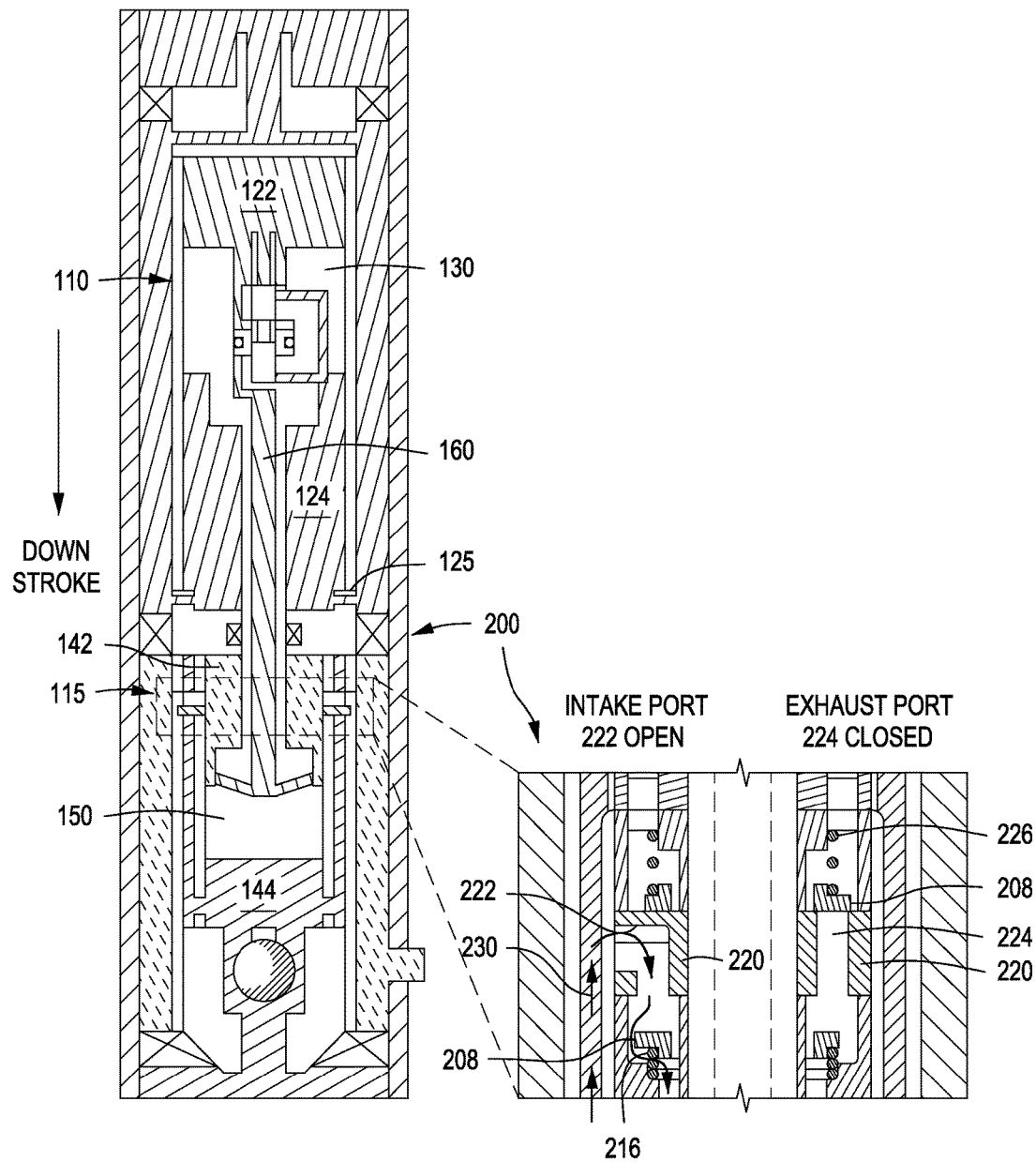

FIGS. 2A and 2B illustrate an example pump system during upstroke and downstroke, respectively, in which a valve assembly in accordance with certain aspects of the present disclosure may be utilized to advantage. It should be noted that while the cut-away views of the valve body 220 in FIGS. 2A and 2B show only a single exhaust port 224 and intake port 222, the valve body 220 may have multiple ports of each type, as is more clearly shown in FIGS. 5 and 7.

The pump system is similar to that described in the above-referenced U.S. Pat. No. 8,303,272, but rather than use a conventional ball-based check valve, a self-cleaning valve assembly 200 is used as a check valve. General operation of the pump system will first be described. Subsequently, particular operation of the check valve assembly during the upstroke (FIG. 2A) and downstroke (FIG. 2B) will be described.

As illustrated, the pump system generally includes an engine section 110 and a pump section 115. As shown, the engine section 110 has an engine piston 130 movably disposed within an engine barrel. Similarly, the pump section 115 has a pump piston 150 movably disposed within a pump barrel. A rod 160 interconnects these two pistons so that they move in tandem in their respective barrels. While not labeled, the rod 160 passes through seal elements where the engine and pump barrels are divided from one another. These seal elements isolate fluid from passing on the outside of the rod 160 between the barrels 120/140. However, the rod 160 may include a passage that allows spent power fluid to communicate between the barrels 120/140 during operation of the pump.

The engine piston 130 is hydraulically actuated between upward and downward strokes by power fluid communicated from the surface to the pump. As the engine piston 130 strokes, the pump piston 150 is moved in tandem with the engine piston 130 by the rod 160. The pump piston 150 varies two volumes 142/144 of its barrel 140, sucks in production fluid into lower volume 144, and discharges produced fluid and spent power fluid out of volume 142 in the process. In particular, during an upstroke of piston 150, fluid is drawn into the lower pump volume 144, while fluid (production fluid and previously spent power fluid) is discharged from the upper pump volume 142.

As illustrated in FIG. 2A, during an upstroke of the pump piston 150, the check valve assembly 200 operates to allow discharge of fluid from the upper pump volume 142, while preventing the backflow of fluid from the upper pump volume 142 into the lower pump volume 144 as follows.

As the upper pump volume 142 decreases during the upstroke, pressure in an exhaust (or discharge) port 224 rises to a sufficient level to unseat a sealing member 208 (biased in a seated position by spring 226). With the sealing member 208 unseated, fluid may be discharged from the upper volume 142, as indicated by the flow arrows.

Meanwhile, as the lower pump volume 144 increases during the upstroke, pressure in the intake port 222 falls to a sufficient level to seat a sealing member 208 (biased in a seated position by spring 216). This prevents fluid from flowing from the upper volume 142 to the lower volume 144.

As will be described in greater detail below, one or more features of the sealing member 208 and/or the port 224 may be designed to promote disturbances in the flow that impede, remove, or displace debris buildup on a surface of a valve body 220 where the sealing members 208 contact.

As illustrated in FIG. 2B, during a downstroke of the pump piston 150, the check valve assembly 200 operates to allow the transfer of fluid (brought in during the previous upstroke) from the lower pump volume 144 into the upper pump volume 142, while preventing the backflow of fluid into the upper pump volume 142.

As the lower pump volume 144 decreases during the upstroke, pressure at the intake port 222 rises to a sufficient level to unseat a sealing member 208 (biased in a seated position by spring 216). With the sealing member 208 unseated, fluid may flow into the upper volume 142, as indicated by the flow arrows.

Meanwhile, as the upper pump volume 142 increases during the downstroke, pressure in the exhaust port 224 falls to a sufficient level to seat the sealing member 208. This prevents fluid from flowing back into the upper volume 142 via the exhaust port 224.

As illustrated in FIGS. 3A and 3B, the sealing members 208 may be designed to create disturbances in the fluid flow within or near the valve body when the disc-plate moves relative to the surface of the valve body 220 to seal or unseal the ports. Under typical operating conditions, this disturbance in the fluid flow, indicated as vortices in the figures, is sufficient to prevent (e.g., impede, remove, or displace) debris buildup on a surface of the valve body 220 where the sealing members 208 contact.

As an alternative, or in addition, the ports themselves may have one or more features designed to promote self-cleaning. For example, as illustrated in FIG. 3C, in inner-surface of intake and/or exhaust ports may have helical grooves or "rifling" 302 designed to create vortical "swirl" as the fluid passes through the port. In some cases, a surface of the valve body may be coated with a material designed to prevent buildup of debris (e.g., a "hydro-phobic" coating that resists buildup).

As illustrated in FIGS. 4A (a top view) and 4B (a side view), according to certain aspects, the sealing members 208 may be formed as protrusions or "wings" extending from a cylindrical body 250, collectively forming what is referred to herein as a disc plate. As will be described in greater detail below, with respect to FIGS. 8, the cylindrical body of the disc plate may fit over a central portion of a cage assembly to help guide the sealing members 208 as they move to and away from the valve body 220. Holes 206 in one or more of the protrusions 206 may allow the disc plate to slide on guide pins that prevent angular rotation and may help keep the sealing members 208 aligned with their respective ports.

Figure 5A:
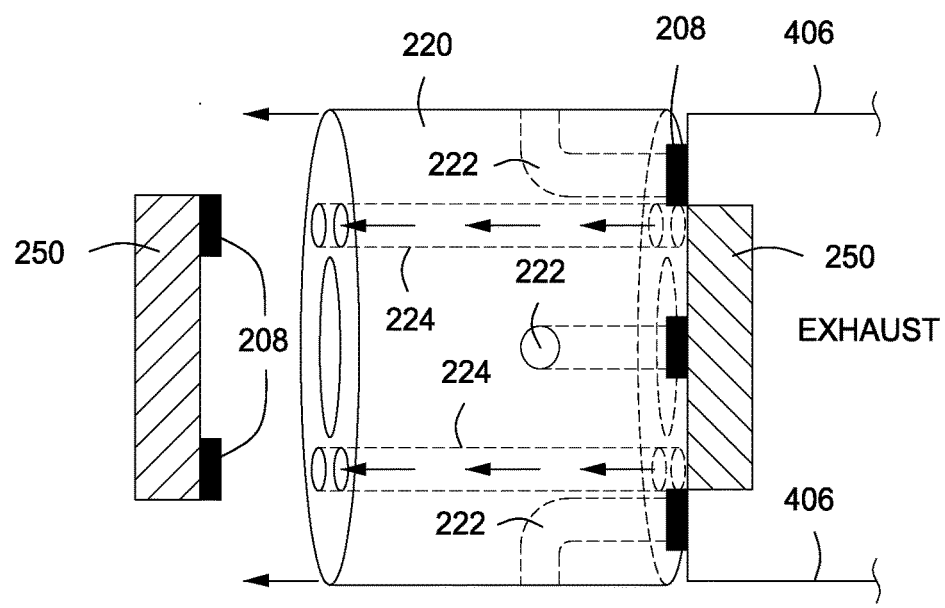
FIGS. 5A and 5B illustrate a larger perspective cut-away side view of an exhaust port during an upstroke and downstroke, in accordance with aspects of the present disclosure.
Figure 5B:
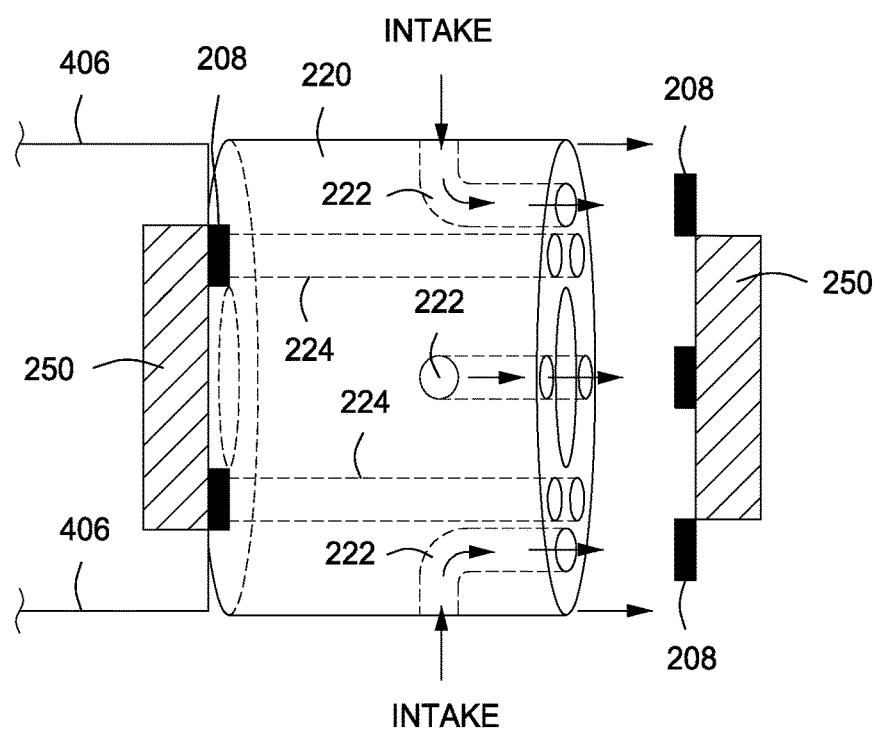

FIGS. 5A and 5B illustrate example operation of a pair of such disc plates and the relative positioning of protruding sealing members 208 with respect to exhaust and intake ports during alternating piston strokes. In other words, FIGS. 5A and 5B show alternate views of the discharge and intake states of valve assembly 200 shown in FIGS. 2A (upstroke) and 2B (downstroke).

As shown in FIG. 5A, during an exhaust state (e.g., pump piston upstroke), the exhaust side disk plate may be displaced from the valve body 220, allowing flow through exhaust ports 224. As shown in FIG. 5B, during the intake state (e.g., pump piston downstroke), the intake side disc plate may be displaced from the valve body, allowing flow through intake ports 222. Due to the relatively high pressure and/or relatively low volume per stroke, the disc plates may only need to travel a relatively short distance to allow sufficient flow. For example, in some cases, the disc plates may only need to travel a few thousandths of an inch (e.g., 0.002"-0.010").

As mentioned above, in some cases, a guide mechanism may be provided to prevent rotation of the sealing members 208 and keep the sealing members aligned with their respective ports. For example, one or more of the sealing members may have holes 206 (more clearly shown in FIG. 4A) allowing the sealing members to slide along guide pins 406 without rotating and losing alignment. The guide pins 406 may be incorporated into a cage assembly described above and shown in FIG. 7.

As shown in FIG. 6A, in some cases, the sealing members may be arranged about a circumference of the disc plate body 250 and designed to promote fluid flow in a same circular direction about the ring. This may be accomplished, as illustrated in FIG. 6B, by having a first portion 602 of the sealing member 208 designed to seal a port, while a second portion 610 is angled to guide the flow in a desired direction.

As described above, sealing members for the intake and exhaust may operate in a complementary manner. In other words, in typical operation, exhaust ports will be sealed while intake ports are open and intake ports will be sealed while exhaust ports are open.

As shown in FIGS. 5A and 5B, described above, this may be accomplished by using a combination of a set of "through" ports 222 that extend a length of a cylindrical valve body, from one end surface to the other, and a set of "angled" ports 224 that extend from one end of the cylindrical valve body to a side.

Operation of this type of arrangement is shown in detail in FIG. 7, which shows opposite ends of the same valve body 220 with through ports 222 and angled ports 224 with respect to their corresponding exhaust/intake disc plate. As illustrated, a first end view of the cylindrical valve body 220 (corresponding to the top discharge portion shown in FIG. 2) shows a sealing surface that has only through ports.

Also shown in FIG. 7 is another feature that may promote self-cleaning, in the form of cut-outs 302/304 that may provide a place for debris (possibly moved away from sealing surface by disturbance in the fluid flow) to settle without interfering in the sealing arrangement of sealing members 208. The cutouts 302/304 may be of any suitable size and shape.

The second end view shown in FIG. 7 (e.g., rotated roughly 180 degrees from the first view and corresponding to the bottom intake portion shown in FIG. 2) shows how the opposite sealing surface has both through ports and angled ports. As illustrated, the angled ports may be offset angularly from the through ports. For example, assuming four through ports evenly spaced by 90 degrees, angled ports may be offset from each through port by 45 degrees. Thus, as shown, the corresponding sealing members for the opposing sides may also be offset by 45 degrees. In this manner, on the side with both through ports and angled ports, the sealing members 208 may be able seal the angled ports, without impeding flow through the through ports.

Of course, those skilled in the art will appreciate that any combination of different types of ports may be used. Further, the exact number of each type of port, as well as the shape of each port may vary (e.g., some may be circular and some non-circular). As an example, exhaust ports may be designed to accommodate the flow of both production fluid and spent power fluid, as described above, and may, thus, be sized larger than intake ports.

Further, while the above pump operation described with reference to FIG. 2 assumed through ports to be exhaust ports and angled ports to be intake ports, this is purely a design choice. With a different design and flow routing, angled ports could be used for exhaust, while straight ports are used for intake. The main design consideration for the type of pump described herein is that a valve body surface that has both type of ports opens to a common volume being filled and emptied (in the example of FIG. 2, the upper volume 142). Those skilled in the art will also appreciate that the terms "intake" and "exhaust" as used herein are relative terms and merely depict relative directional flow through ports formed in the valve body.

According to certain aspects, a disc valve assembly may comprise a cage assembly configured to facilitate the complementary operation described above. As illustrated in FIG. 8, such as cage assembly may include two pieces: an exhaust cage portion 802 and an exhaust cage portion 804.

These pieces may fit together in a sealed manner, with the disc plates contained between an annulus formed between inner and outer cylindrical sections of the cage portions. The cage assembly may be designed to accommodate bias springs 216 and 226, to urge the disc plates in a sealed position in the absence of any overriding pressure. The cage assembly may also be designed to accommodate guide pins 806, as described above, designed to fit through holes 206 in the sealing members 208.

The inner cylinder of the cage portions may be sized to accommodate the rod 160 joining the engine and pump pistons. To isolate this region from flow, the first and second cage portions may be assembled with relatively high contact force to ensure a sealed arrangement. According to some embodiments, one or more portions of the cage assembly may be made of some type of thermo-plastic material, which may facilitate sealing of the separate pieces that form the cage assembly.

As shown, the disc valve assembly, pump piston, and the like, may be housed in a pump housing 808. As shown in FIGS. 2A and 2B, a pump assembly, including a check-valve as described herein, with self-cleaning features, may be deployed in a well bore with an hydraulically driven engine portion, to produce fluids via artificial lift.

By providing a self-cleaning feature, a disc-based check valve assembly described herein may avoid some of the problems of conventional ball-based check valves. As a result of the self-cleaning, the valves may seal longer and costly repair and corresponding lost production time may avoided.

While the self-cleaning features have been described, in some embodiments, the novel complementary arrangement shown in FIGS. 5, 7, and 8, may be deployed to advantage without such self-cleaning features. In other words, the arrangement of offset ports with complementary disc plates having similarly offset sealing members may have independent advantage.

While the foregoing is directed to embodiments of the present disclosure, other and further embodiments may be devised without departing from the basic scope thereof, and the scope thereof is determined by the claims that follow.

What is claimed is:

1. A valve assembly comprising:
   a valve body with a first set of one or more ports that form fluid pathways from a first surface of the valve body to a second surface of the valve body;
   a first disc plate with sealing members configured to seal the first set of ports at the first surface of the valve body when in a closed position;
   a guide mechanism comprising one or more guide pins on which the first disc plate is configured to slide; and
   a self-cleaning mechanism configured to cause a disturbance in fluid flow within or near the valve body when the first disc plate moves relative to the first surface of the valve body to seal or unseal the first set of ports, wherein:
      the disturbance in the fluid flow is sufficient to at least one of impede, remove, or displace debris buildup on a surface of the valve body where the sealing members contact;
      the first disc plate comprises a ring;
      the sealing members comprise two or more individual sealing members, each individual sealing member comprising a protrusion extending from a circumference of the ring; and
      each of one or more of the protrusions comprises a hole configured to receive one of the guide pins.

2. The valve assembly of claim 1, wherein the self-cleaning mechanism comprises one or more cut-outs formed on at least one of the first or second surface of the valve body in proximity to the first set of ports.

3. The valve assembly of claim 2, wherein the one or more cut-outs are configured to allow for deposits of debris.

4. The valve assembly of claim 1, wherein the self-cleaning mechanism comprises helical grooves disposed in a wall of at least one port of the first set of ports, the helical grooves designed to impart vortices in fluid flowing in the at least one port of the first set of ports.

5. The valve assembly of claim 1, wherein the sealing members are configured to disturb fluid flow near the valve body when the first disc plate moves relative to the valve body to seal or unseal the first set of ports.

6. The valve assembly of claim 5, wherein the sealing members are each configured to promote fluid flow in a same circular direction about the ring.

7. The valve assembly of claim 6, wherein the sealing members comprise angled faces designed to promote the fluid flow in the same circular direction about the ring.

8. The valve assembly of claim 1, wherein a surface of at least one of the valve body or the sealing members is coated with a material designed to inhibit build-up of debris.

9. The valve assembly of claim 1, further comprising:
   a second disc plate with sealing members configured to seal a second set of ports that form fluid pathways from the second surface of the valve body to a third surface of the valve body when in a closed position.

10. The valve assembly of claim 9, further comprising:
    another self-cleaning mechanism configured to cause a disturbance in fluid flow within or near the valve body when the second disc plate moves relative to the second surface of the valve body to seal or unseal the second set of ports, wherein the disturbance in the fluid flow is sufficient to at least one of impede, remove, or displace debris buildup on a surface of the valve body where the sealing members of the second disc plate contact.

11. The valve assembly of claim 9, wherein the first and second disc plates are configured to operate in a reciprocal manner, such that:
    when the first disc plate seals the first set of ports in a closed position, the second disc plate is in an open position allowing flow through the second set of ports; and
    when the second disc plate seals the second set of ports, the first disc plate is in an open position allowing flow through the first set of ports.

12. The valve assembly of claim 9, wherein the valve body comprises a cylinder, with the first and second surfaces being opposing end surfaces of the cylinder and the third surface being a side surface of the cylinder.

13. The valve assembly of claim 12, wherein the second set of ports forms angled pathways between the second and third surfaces of the cylinder.

14. The valve assembly of claim 9, wherein
    openings of the first set of ports formed at the second surface of the valve body are spaced about a circumference of the second surface; and
    openings of the second set of ports formed at the second surface of the valve body are interspersed between openings of the first set of ports.

15. The valve assembly of claim 14, wherein sealing members of the second disc plate do not impede flow through the first set of ports when sealing the second set of ports.

16. The valve assembly of claim 15, wherein:
    the openings of the first set of ports formed at the second surface of the valve body are evenly spaced about the circumference of the second surface; and
    the openings of the second set of ports formed at the second surface of the valve body are evenly spaced about the circumference of the second surface, at an angular offset relative to the openings of the first set of ports.

17. The valve assembly of claim 14, wherein each of the first and second sets of ports comprises at least four ports.

18. The valve assembly of claim 14, wherein at least one of the first set of ports is shaped differently than at least one of the second set of ports to accommodate different types of fluid flow.

19. The valve assembly of claim 9, wherein the self-cleaning mechanism comprises one or more cut-outs formed on at least one of the first or second surface of the valve body in proximity to one or more ports of at least the first or second set of ports.

20. The valve assembly of claim 9, wherein the self-cleaning mechanism comprises helical grooves disposed in a wall of at least one port of the first or second set of ports, the helical grooves designed to impart vortices in fluid flowing in the at least one port of the first or second set of ports.

21. The valve assembly of claim 1, further comprising:
a cage assembly configured to facilitate sliding of the first disc plate relative to the first surface of the valve body to seal and unseal the first set of ports.

22. The valve assembly of claim 21, wherein:
the cage assembly comprises an inner-cylindrical section and an outer-cylindrical section; and
the first disc plate is disposed between the inner and outer cylindrical sections of the cage assembly.

23. The valve assembly of claim 22, wherein the cage assembly comprises at least two sections in sealed engagement.

24. The valve assembly of claim 23 wherein at least one of the at least two sections is made of a thermoplastic material to facilitate sealing with the other section.

25. The valve assembly of claim 23, wherein the cage assembly comprises the guide mechanism to prevent angular rotation of the first disc plate as the first disc plate moves relative to the first surface of the valve body to seal or unseal the first set of ports.

26. The valve assembly of claim 1, wherein the guide mechanism is configured to prevent angular rotation of the first disc plate as the first disc plate moves relative to the first surface of the valve body to seal or unseal the first set of ports.

27. The valve assembly of claim 1, wherein each of at least two of the protrusions comprises the hole and wherein each hole is configured to receive the one of the guide pins to prevent angular rotation of the first disc plate as the first disc plate moves relative to the first surface of the valve body to seal or unseal the first set of ports.

28. A pump assembly comprising:
a pump piston, designed to move up and down in alternating strokes to intake wellbore fluid into a lower volume, transfer the wellbore fluid into an upper volume, and discharge the wellbore fluid from the upper volume for delivery to a surface of the wellbore; and
a check valve assembly to control flow of the wellbore fluid from the lower volume to the upper volume and from the upper volume to a discharge port, the check valve assembly comprising:

a valve body with at least a set of one or more ports that form fluid pathways from a first surface of the valve body to a second surface of the valve body;
a disc plate with sealing members configured to seal the set of ports at the first surface of the valve body when in a closed position;
a guide mechanism comprising one or more guide pins on which the first disc plate is configured to slide; and
a self-cleaning mechanism configured to cause a disturbance in fluid flow within or near the valve body when the disc plate moves relative to the first surface of the valve body to seal or unseal the set of ports, wherein:
the disturbance in the fluid flow is sufficient to at least one of impede, remove, or displace debris buildup on a surface of the valve body where the sealing members contact;
the disc plate comprises a ring;
the sealing members comprise two or more individual sealing members, each individual sealing member comprising a protrusion extending from a circumference of the ring; and
each of one or more of the protrusions comprises a hole configured to receive one of the guide pins.

29. A valve assembly comprising:
a valve body with a first set of one or more ports that form fluid pathways from a first surface of the valve body to a second surface of the valve body;
a first disc plate with sealing members configured to seal the first set of ports at the first surface of the valve body when in a closed position;
a guide mechanism comprising one or more guide pins on which the first disc plate is configured to slide; and
a self-cleaning mechanism configured to cause a disturbance in fluid flow within or near the valve body when the first disc plate moves relative to the first surface of the valve body to seal or unseal the first set of ports, wherein:
the disturbance in the fluid flow is sufficient to at least one of impede, remove, or displace debris buildup on a surface of the valve body where the sealing members contact;
the first disc plate comprises a ring;
the sealing members comprise two or more individual sealing members, each individual sealing member comprising a protrusion extending from a circumference of the ring; and
one or more of the protrusions are L-shaped with a hole configured to receive one of the guide pins.

* * * * *